(12) United States Patent
Patel et al.

(10) Patent No.: US 8,125,911 B2
(45) Date of Patent: Feb. 28, 2012

(54) FIRST-HOP DOMAIN RELIABILITY MEASUREMENT AND LOAD BALANCING IN A COMPUTER NETWORK

(75) Inventors: Rahul G. Patel, Nashua, NH (US); Pritam Shah, Fremont, CA (US); Dana Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 12/324,081

(22) Filed: Nov. 26, 2008

(65) Prior Publication Data

US 2010/0128606 A1  May 27, 2010

(51) Int. Cl.
*H04L 12/26* (2006.01)
(52) U.S. Cl. ...................................... 370/241
(58) Field of Classification Search .................. 370/241, 370/248, 250, 252, 253, 356, 389, 392, 400, 370/401; 709/223, 238, 249, 250
See application file for complete search history.

(56) References Cited

U.S. PATENT DOCUMENTS

| | | | |
|---|---|---|---|
| 6,400,686 B1 | 6/2002 | Ghanwani et al. | |
| 6,662,223 B1 | 12/2003 | Zhang et al. | |
| 6,751,191 B1 | 6/2004 | Davar et al. | |
| 6,775,235 B2 * | 8/2004 | Datta et al. | 370/238 |
| 6,795,860 B1 | 9/2004 | Shah | |
| 6,868,068 B1 | 3/2005 | Jain et al. | |
| 6,885,642 B1 | 4/2005 | Jain et al. | |
| 6,912,203 B1 | 6/2005 | Jain et al. | |
| 6,934,293 B1 | 8/2005 | DeJager et al. | |
| 7,072,979 B1 | 7/2006 | Aviani, Jr. et al. | |
| 7,088,706 B2 | 8/2006 | Zhang et al. | |
| 7,092,410 B2 | 8/2006 | Bordonaro et al. | |
| 7,111,073 B1 | 9/2006 | Jain et al. | |
| 7,213,154 B1 | 5/2007 | Carter et al. | |
| 7,233,575 B1 | 6/2007 | Jarvis | |
| 7,260,645 B2 * | 8/2007 | Bays | 709/238 |
| 7,328,237 B1 | 2/2008 | Thubert et al. | |
| 7,342,897 B1 | 3/2008 | Nader et al. | |
| 7,349,348 B1 | 3/2008 | Johnson et al. | |
| 7,349,979 B1 | 3/2008 | Cieslak et al. | |
| 7,414,979 B1 | 8/2008 | Jarvis | |
| 7,415,523 B2 | 8/2008 | O'Rourke et al. | |
| 7,447,153 B2 * | 11/2008 | Klinker | 370/231 |
| 7,451,209 B1 | 11/2008 | Schieber et al. | |
| 7,457,877 B1 | 11/2008 | Shah et al. | |
| 7,620,037 B1 * | 11/2009 | Bhaskaran et al. | 370/356 |
| 2002/0099816 A1 * | 7/2002 | Quarterman et al. | 709/224 |
| 2002/0177910 A1 * | 11/2002 | Quarterman et al. | 700/28 |
| 2003/0161313 A1 * | 8/2003 | Jinmei et al. | 370/392 |
| 2004/0052207 A1 | 3/2004 | Charny et al. | |
| 2005/0025179 A1 | 2/2005 | McLaggan et al. | |
| 2005/0108386 A1 * | 5/2005 | Acharya et al. | 709/224 |
| 2006/0106938 A1 | 5/2006 | Dini et al. | |
| 2006/0159065 A1 | 7/2006 | Jennings | |

(Continued)

*Primary Examiner* — Dmitry H Levitan
(74) *Attorney, Agent, or Firm* — Cesari and McKenna, LLP (57) ABSTRACT

In one embodiment, probe messages may be transmitted from a local domain to a set of one or more responding probe targets located beyond a plurality of probed first-hop domains of the local domain, the probe messages transmitted via each of a plurality of probed first-hop domains. A reliability of each probed first-hop domain may then be determined based on responsiveness of probe messages transmitted via each respective probed first-hop domain, such that traffic destined beyond the probed first-hop domains may be load balanced across the probed first-hop domains based on the respective reliability, regardless of a traffic-class and a destination of the traffic.

30 Claims, 5 Drawing Sheets

U.S. PATENT DOCUMENTS

| | | |
|---|---|---|
| 2006/0168168 A1 | 7/2006 | Xia et al. |
| 2006/0171316 A1 | 8/2006 | El-Sakkout et al. |
| 2006/0187937 A1 | 8/2006 | Townsley et al. |
| 2006/0221844 A1 | 10/2006 | Subramanian et al. |
| 2006/0221974 A1 | 10/2006 | Hilla et al. |
| 2006/0227705 A1 | 10/2006 | Chandwadkar et al. |
| 2006/0239204 A1 | 10/2006 | Bordonaro et al. |
| 2006/0245361 A1 | 11/2006 | Cheethirala et al. |
| 2006/0250964 A1 | 11/2006 | Vasseur et al. |
| 2007/0118670 A1 | 5/2007 | Viswanath et al. |
| 2007/0121515 A1 | 5/2007 | Donovan et al. |
| 2007/0124478 A1 | 5/2007 | Abdelhamid et al. |
| 2007/0153772 A1 | 7/2007 | Shankar et al. |
| 2007/0162612 A1 | 7/2007 | Paggen |
| 2007/0165622 A1 | 7/2007 | O'Rourke et al. |
| 2007/0177506 A1 | 8/2007 | Singer et al. |
| 2007/0232322 A1 | 10/2007 | Jagadeesan et al. |

* cited by examiner

FIRST-HOP DOMAIN RELIABILITY MEASUREMENT AND LOAD BALANCING IN A COMPUTER NETWORK

TECHNICAL FIELD

The present disclosure relates generally to computer networks, and, more particularly, to domain exit selection.

BACKGROUND

In certain computer network configurations, a particular network domain (e.g., an autonomous system, or "AS") may be "multi-homed" to the computer network, such that multiple paths or exits are available to that network domain to reach destination address prefixes located in a remote network domain. For example, this multi-homing may be provided by interconnecting the particular network domain to a plurality of service providers (e.g., Internet Service Providers, "ISPs"), often in order to achieve redundancy in the event of a failure, and/or to provide a mechanism that may be used to load balance (e.g., distribute) traffic destined to a remote domain. For instance, where available, multiple paths may share the traffic (the "load") in an effort to reduce network congestion at any one service provider.

Currently, the particular (local) network domain may load balance traffic across these service providers, or more generally, these "first-hop domains" (being the first-hop from the particular local domain to reach any other remote domain), based on various factors. Simple algorithms may merely load balance traffic across each possible first-hop domain, regardless of how reliable the first-hop domains may be (that is, regardless of how well the traffic is handled through the first-hop domains, e.g., lost packets, delayed packets, etc.). More complex algorithms are also available that may distribute traffic across the multiple exits based on performance measurements of particular traffic-classes. For example, through either passive monitoring or active probing for each traffic-class, traffic for each traffic-class may be routed/forwarded over a specific best performing path/exit to reach a particular destination address prefix in a remote domain.

These performance measurements, however, while being generally accurate in determining a best performing path per-traffic class and per-prefix, may be more information than necessary for certain networks. For example, certain networks may desire simple load balancing across multi-homed first-hop domains, as opposed to more complex performance-based routing to determine a particular path/exit for specific traffic-classes to specific destination address prefixes.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, probe messages may be transmitted from a local domain to a set of one or more responding probe targets located beyond a plurality of probed first-hop domains of the local domain, the probe messages transmitted via each of a plurality of probed first-hop domains. A reliability of each probed first-hop domain may then be determined based on responsiveness of probe messages transmitted via each respective probed first-hop domain, such that traffic destined beyond the probed first-hop domains may be load balanced across the probed first-hop domains based on the respective reliability, regardless of a traffic-class and a destination of the traffic.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a node that interconnects different domains together is generally referred to as an "edge node/router" (or "border node/router").

Figure 1:
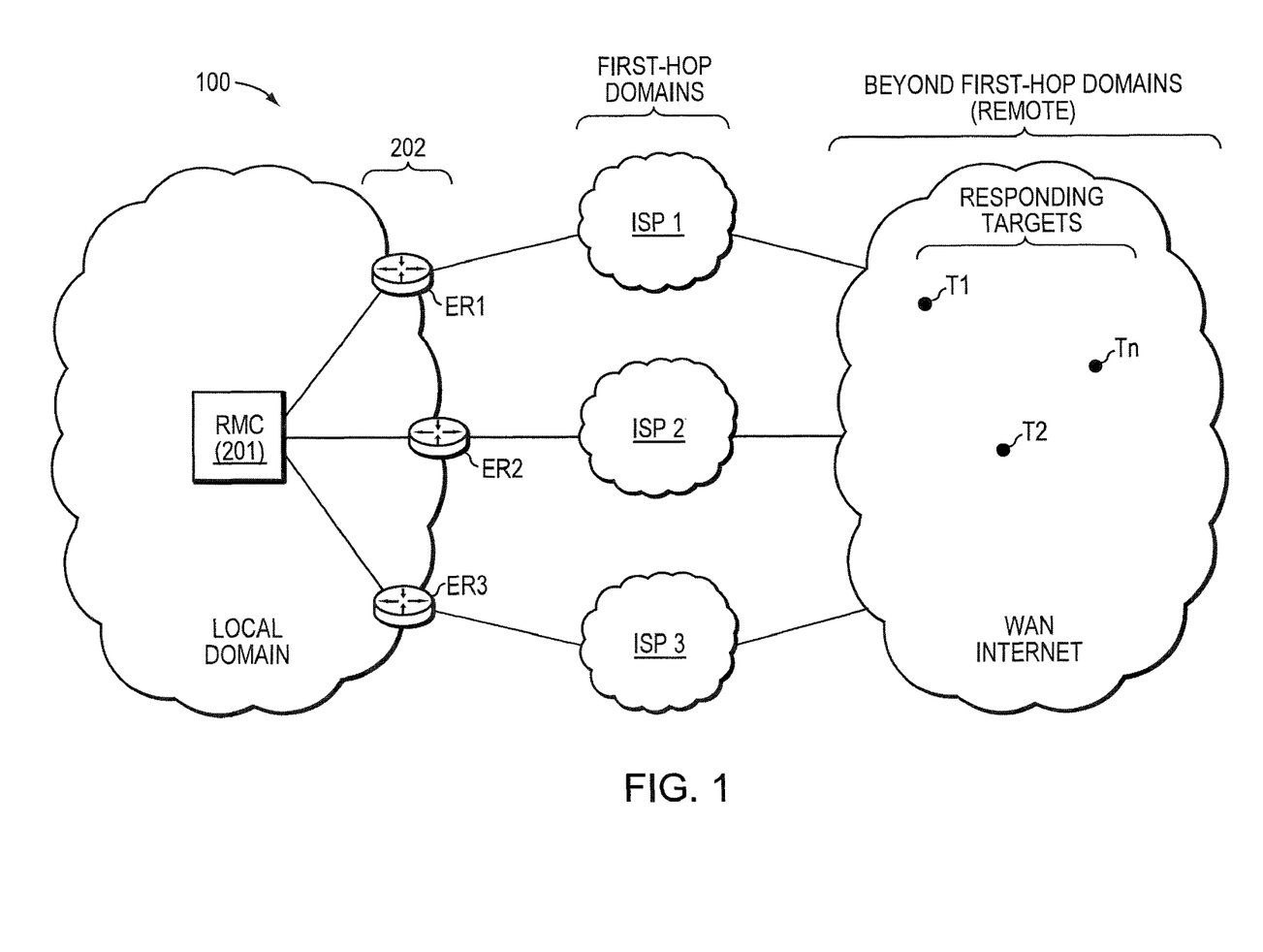
FIG. 1 illustrates an example computer network.

FIG. 1 is a schematic block diagram of an example computer network 100 illustratively comprising various nodes/devices of various domains interconnected by links as shown (notably, not all nodes/devices are shown for simplicity). Illustratively, each domain may comprise one or more interdomain/edge routers, e.g., ER1-ER3 of the local domain, through which client communications, such as data packet traffic, may pass into and out of the domain. In general, each domain may be an AS, an enterprise network, a service provider network (an "ISP"), or any other network or subnetwork. Furthermore, each domain, illustratively the local domain, may be multi-homed, i.e., comprising a plurality of different peer (neighboring) connections to one or more other routing domains or ASes (e.g., the local domain to first-hop domains ISP1, ISP2, and ISP3). In addition, routing operations at certain edge nodes ER1-ER3 may be managed by a routing master controller (RMC) 201, such as in accordance with optimized edge routing (OER, or "performance routing") as described herein (e.g., as an OER "Master node" or OER master controller), which may be connected to the edge nodes by, e.g., point-to-point links or a local area network.

Data packets (e.g., traffic) may be exchanged among the nodes/devices of the computer network 100 using predefined network communication protocols such as the TCP/IP, User Datagram Protocol (UDP), Asynchronous Transfer Mode (ATM) protocol, Frame Relay protocol, Internet Packet Exchange (IPX) protocol, etc.

Figure 2:
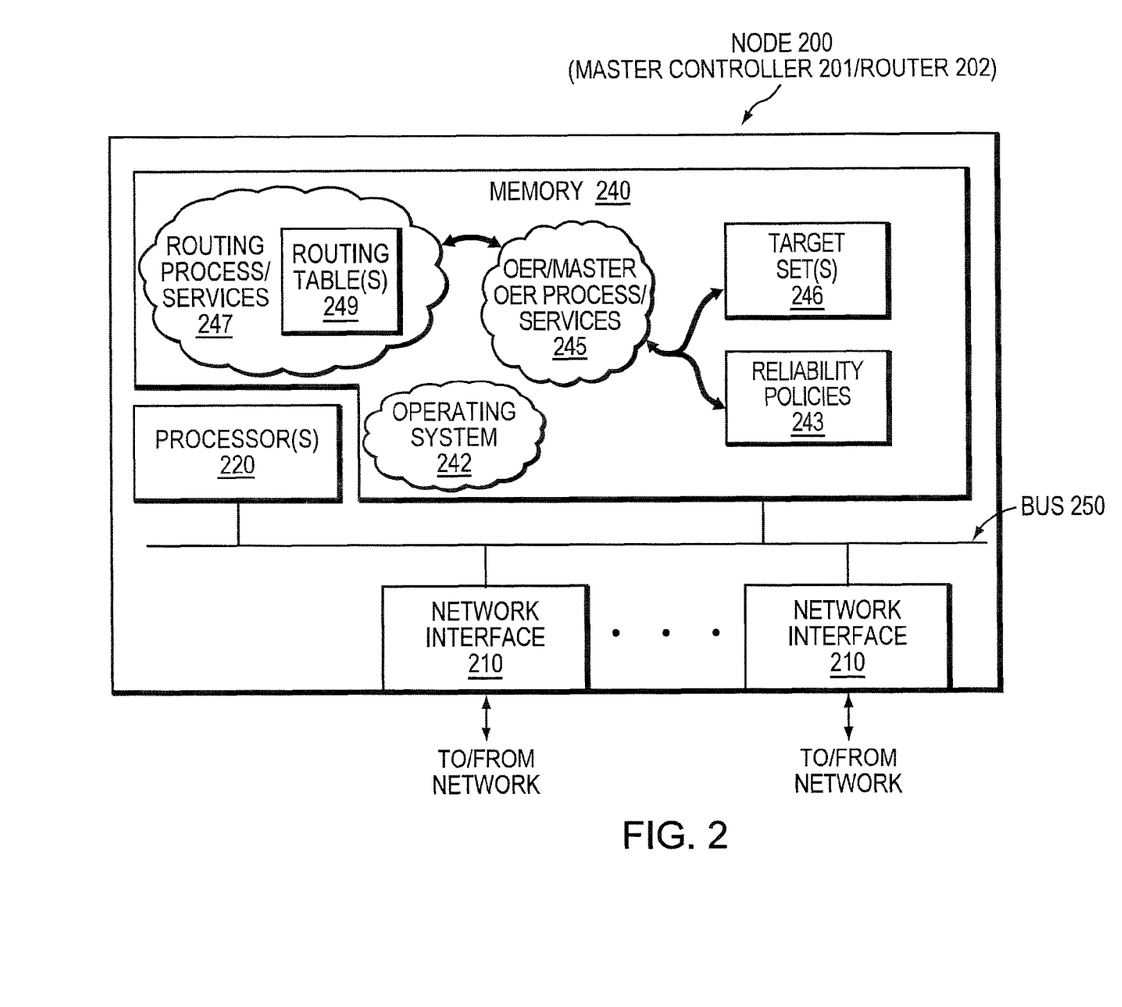
FIG. 2 illustrates an example network device/node.

FIG. 2 is a schematic block diagram of an example node/device 200 that may be advantageously used with one or more embodiments described herein, e.g., as routing master controller ("201") or a router (e.g., edge router, "202"). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. Each processor 220 may comprise necessary elements or logic adapted to execute the software programs and manipulate the data structures, such as routing tables 249, target set(s) 246, and reliability policies 243. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 247, and OER/Master OER process/services 245 in accordance with one or more embodiments described herein. It will be apparent to those skilled in the art that other types of processors and memory, including various computer-readable media, may be used to store and execute program instructions (e.g., software) pertaining to the inventive technique described herein.

Routing process/services 247 contain computer executable instructions executed by each processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage one or more routing/forwarding information database (e.g., routing tables 249) containing, e.g., data used to make routing and forwarding decisions. Specifically, the routing tables are generally used for storing reachable destination addresses, a next-hop interface, and next-hop address to reach each destination, and optionally other information, such as an associated metric (e.g., cost) of reaching the destination, based on network topology. In particular, changes in the network topology may be communicated among routers 200 using routing protocols, such as the conventional OSPF and IS-IS link-state protocols (e.g., to "converge" to an identical view of the network topology). Notably, routing services 247 may also perform functions related to virtual routing protocols, such as maintaining VRF instances (not shown), or tunneling protocols, such as for Multi-Protocol Label Switching, etc., each as will be understood by those skilled in the art.

OER/Master OER process/services 245 contain computer executable instructions executed by each processor 220 to perform functions illustratively employed by an OER node 202 (e.g., edge routers ER1-ER3) and an OER master controller 201, respectively. The Master OER process 245 executing on the OER Master node communicates with edge routers ER1-ER3 to request, among other things, the monitoring of a set of address prefixes (e.g., in particular, according to the novel techniques described herein). The OER processes 245 executing on the edge routers monitor traffic at the edge of the local domain and respond with, inter alia, network statistics corresponding to the monitored prefixes. Illustratively, OER process 245 may be configured to measure various types of network statistics acquired from monitored traffic. (Notably, while one OER process 245 is illustratively in memory 240, instances of the OER process 245 may execute on the network interfaces 210 (not shown).) These statistics are then forwarded to the Master OER process 245. The statistics may correspond to various traffic measurements, such as round-trip delay times (RTT), data throughput (i.e., the amount of data transferred or received), packet loss, reachability, etc. for each of the monitored prefixes. In general, the OER processes 245 may measure any arbitrary traffic metric, including conventional cost-based and distance-based metrics. Further, the OER process 245 may calculate statistical averages, variances, medians, etc. of a collection of traffic measurements.

The statistics and measurements received from the OER process 245 of the edge routers 202 may then be processed at the OER master controller 201 in accordance with the Master OER process 245. More specifically, the Master OER process 245 analyzes the statistics and determines whether the distribution of traffic entering and/or leaving the local domain can be optimized. If so, the Master OER process may redistribute traffic routed through the edge nodes by, e.g., associating new BGP local-preference values with selected traffic or statically changing the routing table contents of the edge nodes (which may then be propagated within the local domain accordingly). In that sense, the Master OER process selects optimal exit links (OELs) (that is, a "best exit selection") to various destination prefixes, e.g., based on traffic type, traffic class, destination prefixes, etc., in addition to their real-time performance as determined by the received statistics. Ultimately, the end result is improved Internet performance, better load distribution, and/or lower costs for Internet connections. Notably, the Master OER process 245 may be distributed among a plurality of nodes, and thus need not reside in a single OER master controller 201. Also, it is not necessary for a single OER master controller to contain routing processes or routing tables, other than what is necessary for communication with the border nodes.

In order to obtain statistics, the OER processes 245 may passively monitor and/or actively probe the monitored prefix. Passive monitoring relies on gathering information from OERs learned from monitoring conventional user traffic, such as throughput, timing, latency, packet loss, reachability, etc. Active probing, on the other hand, relies on probe packets to measure various parameters associated with accessing the monitored prefix from an originating node (source). Probe packets are used by an edge node/router to measure various parameters (e.g., jitter, delay, loss, reachability, etc.) associated with reaching the monitored prefix (e.g., a target prefix) in the network. Specifically, probe packets (requests) are generated by the edge router 202 (OER process 245), generally upon a request from the OER Master Controller 201, and transferred to a target node associated with the target prefix. The target node acquires each probe packet, and returns a response (reply) to the border node, such as by, e.g., modifying and returning the probe packet, returning a newly-generated response packet, or including the desired response information in a modified conventional return message (e.g., an ACK message). The border node then uses the returned probe packet to measure the various parameters associated with reaching the target prefix, and returns the results to the OER Master controller.

For instance, assume that edge router ER1 in the local domain measures round-trip packet delay times (RTT) for traffic sent to target T1 in a remote domain, such as by measuring latencies of establishing a TCP session. The OER processes 245 of ER1 measure the latency between sending a TCP synchronize-sequence-number (SYN) packet to T1 and receiving a corresponding acknowledgement (ACK) packet. Alternatively, the OER processes may employ other techniques for measuring the round-trip delay times, such as issuing conventional "echo" packets (or "ping" packets). Those skilled in the art will understand that the probe packets may be used with a number of known protocols, such as ICMP, UDP, TCP, RTP, HTTP, etc. Notably, echo request and reply messages (echo packets) from the various protocols are described generally herein as probe packets/messages. Moreover, it may be desirable to control the rate at which the probe packets are sent to the targets to thereby avoid refusal (filtering) by the ISP from what may appear to be a "denial of service" or "DoS" attack, for instance, as detected by an intrusion detection system (IDS). As a result, the rate at which probe packets are sent may be limited to a very slow rate, e.g., one probe packet per minute.

The edge routers 202 send the probe packets to various targets that represent a given monitored prefix. Targets within the given prefix may either be configured targets or learned targets. A configured target may be manually configured by a system administrator or customer at the OER Master node. An example of a configured target may be where an administrator has an agreement with the target in the prefix, e.g., such as a target using UDP. Each configured target is assumed to be usable, such as where the agreement between networks (domains/ASes) ensures that a valid response will be returned.

A learned target, on the other hand, is a target that may be learned by monitoring traffic at the exits. For instance, a learned target can be determined by monitoring traffic that a data connection has been made from an exit to a particular node in the monitored prefix, (e.g., by detecting a TCP connect). From this information, a list can be created of nodes within a prefix, such as T1-Tn. An example software application that may be used to collect network statistics is Net-Flow™ by Cisco Systems, Inc. These learned nodes from the target prefix may then be used as the learned targets. Typically, although not necessarily, the most frequently used nodes or the nodes with the highest traffic through-put will be the most representative learned target nodes for a given prefix, such as a web server within the prefix. It may be desirable, however, to use configured targets prior to using learned targets.

One issue that arises with the use of targets to represent an entire monitored prefix is how to determine if a target is a valid target. For example, while a responding target is a valid target that can be used to measure parametric information, a non-responding target may be caused by a network problem, e.g., policy filtering (e.g., firewalls), blackholes, brownouts, etc., or simply that the target (host) itself was turned off (e.g., for maintenance or other reasons) or otherwise not responding for its own specific (non-network related) reason. In the case of a non-responding target, non-response due to a network problem such as a failure is valid for purposes of measuring parametric information for the monitored prefix, since a network failure in reaching the target may apply to reaching the entire monitored prefix. Non-response due to the target itself being powered off or otherwise inaccessible or inactive is not valid for measuring parametric information, because it does not represent the monitored prefix as a whole. Also, in the event that all representative targets for a monitored prefix do not respond, the source may improperly conclude that the entire prefix is unreachable, while the prefix in general (other than the non-responding targets) may still exist and function properly.

An illustrative target management technique, therefore, may dynamically select an optimal set of valid targets (e.g., set 246) for a particular (monitored) prefix of the computer network. Specifically, one or more targets may be selected from a pool of possible learned and configured targets to be used as representatives of the monitored prefix. Probe packets may be sent from the source to the selected targets for the duration of an evaluation period. Targets that do not respond to the probe packets during the evaluation period are invalid and deselected, and if available, an unused target is selected from the pool of possible targets to replace each non-responding target for a next evaluation period. Invalid learned targets may be discarded, while invalid configured targets may be returned to the pool of possible targets for potential re-selection in a later evaluation period.

Notably, in a typical network, there are often multiple paths that may be available to reach a particular destination prefix (e.g., for multi-homed sites as discussed above). Active probing generally probes all available paths in order to determine the parametric information, thereby allowing OER processes to select one or more preferred paths from the set of all paths (e.g., according to a specified policy). Actively probing all available paths all the time to determine the best path requires significant resources on the probe source (router), the target and, generally, the network. As those skilled in the art will understand, the network is more likely to filter probe responses during the probing of all paths, while the probing may actually create congestion that impacts the quality of each probe packet and response.

An illustrative technique may thus be utilized for efficiently sending probe packets from a source to a target in a destination prefix over two or more paths of a computer network. For example, OER processes 245 may send probe packets over a selection of one or more (e.g., all) available paths (exits) to the target in the destination prefix (e.g., through the edge routers 202). Once the preferred path is selected ("path selection optimization"), the source OER processes 245 may send probes to that target only over the preferred path until a trigger occurs, such as, e.g., an out of policy (OOP) event, a policy change, or an optional timer-based trigger. Upon being triggered, the source again probes all paths (the current path and the alternate/non-current paths) to reselect the preferred path to reach the target (i.e., the associated destination address prefix).

As noted above, local network domains may load balance traffic across first-hop domains (e.g., service providers) based on simple algorithms (such as merely load balancing traffic across each possible first-hop domain, regardless of reliability) or more complex algorithms. For instance, complex algorithms based on performance measurements of particular traffic-classes to particular destination address prefixes, obtained through either passive monitoring or active probing, may be used route/forward corresponding traffic over a specific best performing path/exit.

Again, these performance measurements, however, while being generally accurate in determining a best performing path per-traffic class and per-prefix, may be more information than necessary for certain networks. For example, certain networks may desire simple load balancing across multi-homed first-hop domains, as opposed to more complex performance-based routing to determine a particular path/exit for specific traffic-classes to specific destination address prefixes. For instance, for merely load balancing traffic, there is no need to probe each and every traffic-class to targets within each and every prefix to determine a reliability of the first-hop domains. In addition, probing each and every traffic-class and prefix may create a scalability problem, and increases the chance to triggering an IDS (intrusion detection system) alert, as may be appreciated by those skilled in the art. Also, passive measurement is often slow to react to changes and/or problems in the network (and may be limited to certain types of traffic, e.g., only TCP traffic and not UDP traffic).

First-Hop Domain Reliability and Load Balancing

According to embodiments of the disclosure, probe messages may be transmitted from a local domain to a set of one or more responding probe targets located beyond a plurality of probed first-hop domains of the local domain, the probe messages transmitted via each of a plurality of probed first-hop domains. A reliability of each probed first-hop domain may then be determined based on responsiveness of probe messages transmitted via each respective probed first-hop domain, such that traffic destined beyond the probed first-hop domains may be load balanced across the probed first-hop domains based on the respective reliability, regardless of a traffic-class and a destination of the traffic.

Illustratively, one or more embodiments described herein may utilize OER processes (or "performance routing" process) 245 to measure reliability of first-hop domains for exit path load balancing in accordance with one or more embodiments described herein. In particular, Master OER process 245 of an RMC may operate to control various aspects of the techniques described herein, being in cooperative collaboration with OER process 245 of edge routers as described above to send and receive probe messages as described herein. In other words, the performance routing or OER process 245 when executed may be operable to selectively probe targets (e.g., random targets) in the Internet to determine the reliability of the first-hop domains (e.g., ISPs) and then load balance the traffic across reliable first-hop domains. At the same time, the techniques herein reducing the number of probes and decrease the reaction time to congestion or blackout detection and mitigation (and may also rotate targets periodically to avoid IDS triggers).

Operationally, the RMC 201 may initially determine a set of responding probe targets located beyond first-hop domains, at least those first-hop domains that are to be probed (that is, not all first-hop domains need be considered). These targets, in particular, need not correspond to any specific destination address prefix, or to any specific traffic-class, they simply should be beyond the first-hop domains. For instance, the RMC may learn several targets beyond the first-hop domains (e.g., T1-Tn), but selects a few responding targets (e.g., less than ten, for example, five) to measure path availability across the first-hop domains (e.g., T1 and T2).

For better measurements and to avoid IDS triggers, the targets may be rotated (changed) periodically for better measurement and to avoid IDS triggers. Optionally, the RMC may periodically flush all the targets of set 246 and repeat the process of selecting responsive targets. Generally, management of the targets may be performed in a similar manner to that described above. For example, if ten targets are learned, where eight are responding and two are not, then the two non-responding targets would be deleted, and the remaining eight targets would be stored in target set list 246. Any subset of the targets (e.g., five of the eight targets) may then be used, for example, periodically changing which five for the reasons above. Notably, only those targets that are known to be responsive may be used, such that if it is determined that no response is received from the target, the target is removed from set/list 246.

Notably, to increase the likelihood of probe responsiveness, probe messages may be configured to have a destination of a known server port. For example, probe targets may be selected that have packets destined to it on port 80 (a hypertext transfer protocol (http) port), a TCP port, or any other well-known server port. Also, to increase confidence in the reliability measurement (described below), the set of targets 246 may be determined based on path diversity of the paths to reach the targets with the probe messages. For example, by knowing the paths from the local domain to the targets (e.g., using a known "traceroute" technique), selecting targets with more diverse paths reduces the likelihood that a failure within the network will affect a large proportion of the probe messages sent out.

Figure 3A:
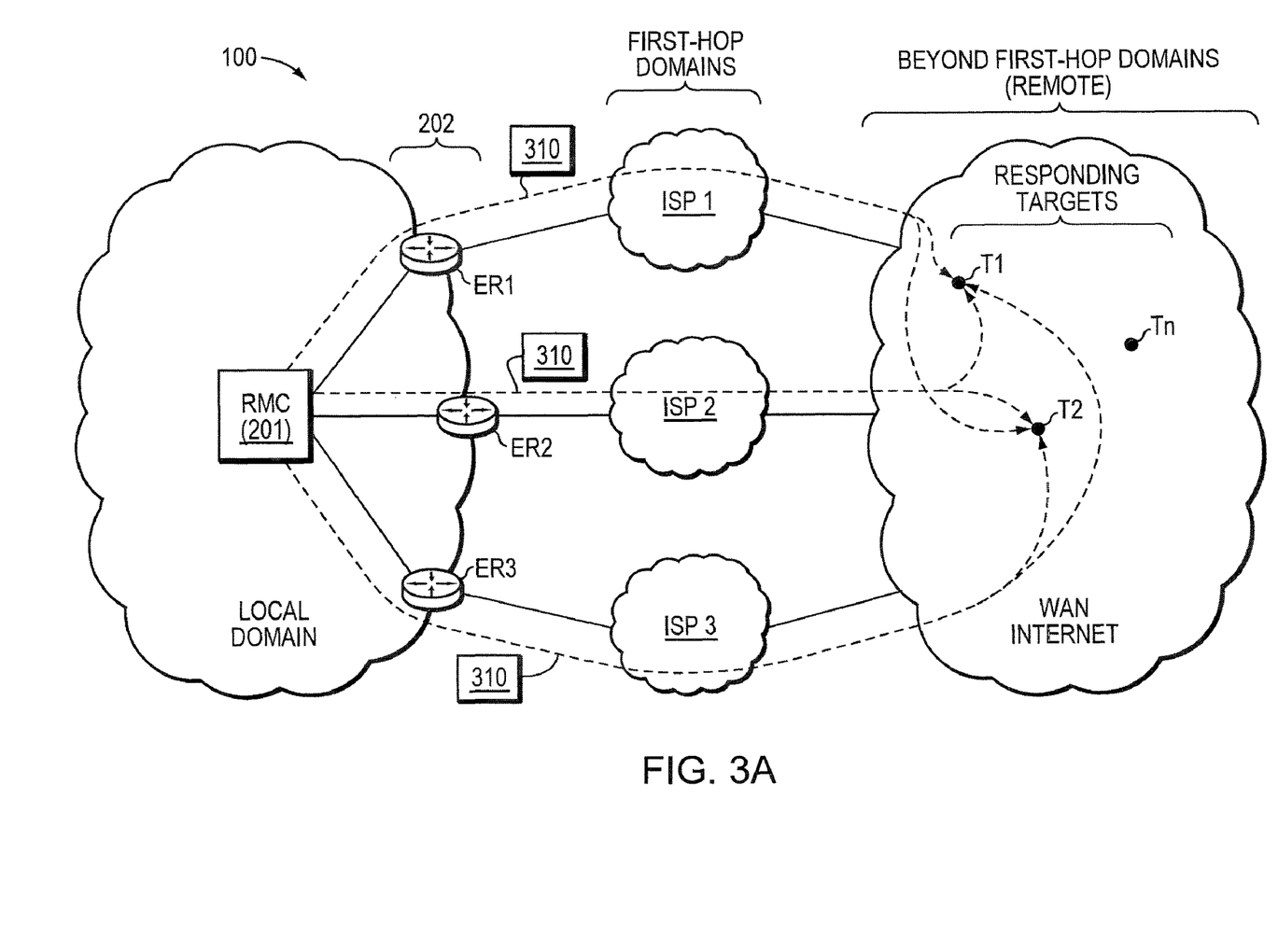
FIG. 3A illustrates an example transmission of probe messages.

Once the targets are determined, the RMC may transmit (or may request transmission of) probe messages from the local domain to the set of targets via each of the probed first-hop domains. For instance, each edge/exit router of a probed domain, e.g., ER1-ER3, may transmit a probe message toward each of the probed targets (e.g., T1 and T2). Briefly, FIG. 3A illustrates the network 100 of FIG. 1 with probe messages/packets 310 being transmitted in such a manner. To determine a reliability of each probed first-hop domain, the RMC may determine the responsiveness of probe messages transmitted via each respective probed first-hop domain; that is, which probe messages received responses (e.g., within a configurable time period). Based on the reliability of the first-hop domains (where reliability is general, and need not imply per-traffic class reliability), the RMC may load balance traffic destined beyond the probed first-hop domains across the probed first-hop domains, regardless of a traffic-class and a destination of the traffic.

Figure 3B:
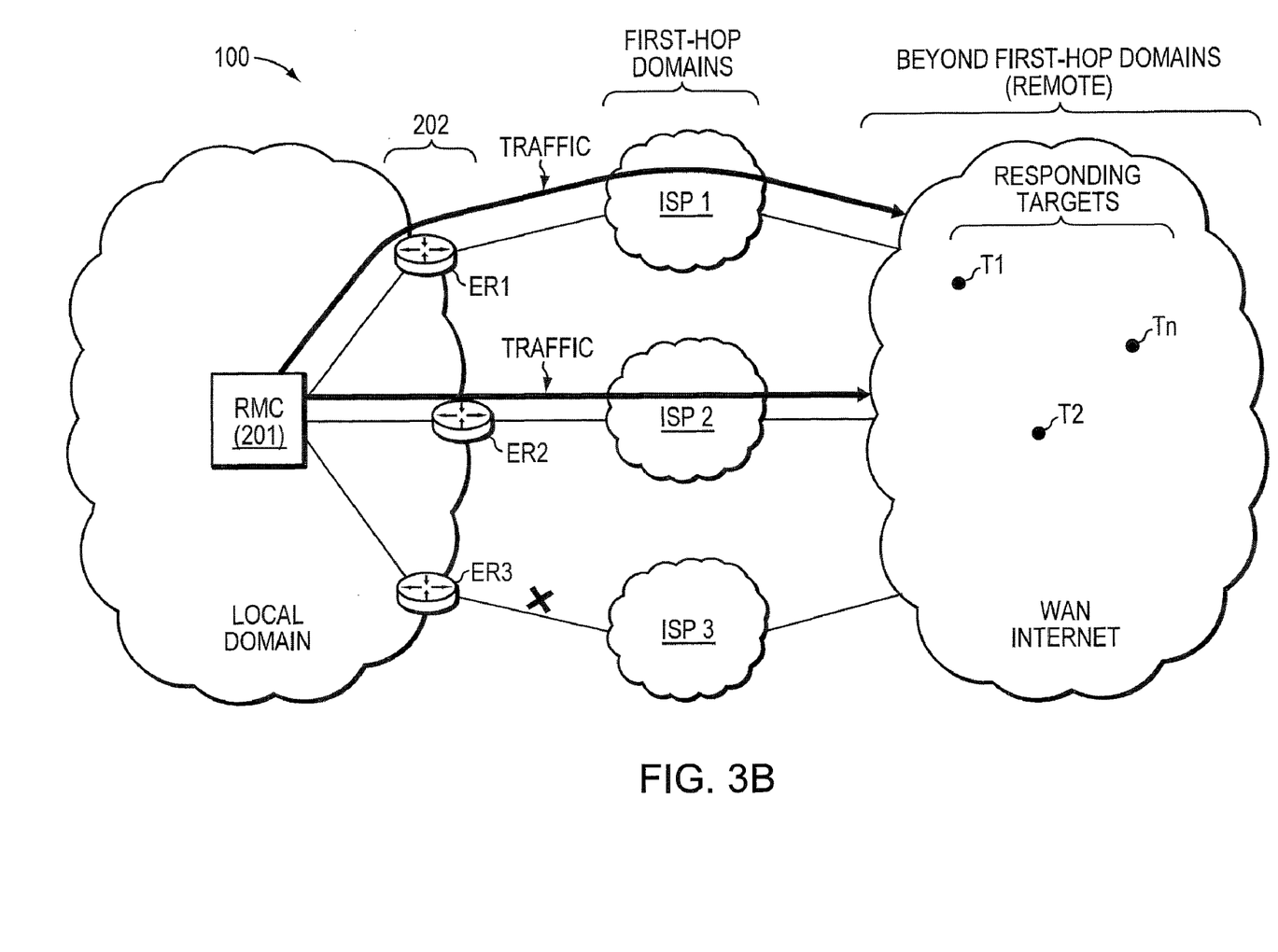
FIG. 3B illustrates an example distribution of traffic.

For example, the result of the probe responses determines the availability of a particular path/exit. If a configurable amount (e.g., percentage) of the probe targets do not respond from one first-hop domain (e.g., ISP3), but do respond from other first-hop domains (e.g., ISP1 and ISP2), then the less-responsive domain is deemed to be unreliable. (As noted, if the probe target is not reachable from any path/exit, then the target is declared to be unresponsive and it is removed from the list of selected targets.) Illustratively, assume that 70% of the probes receive a response when they are sent through ISP3, 90% through ISP2, and 99% through ISP1. Assuming that a threshold of reliability is configured at 75% (that is, no more than ¾ of the traffic may be lost or otherwise errored), the connection through ISP3 (ER3) should be deemed unreachable/unusable. In such a case, the RMC may forward all traffic for all applications (all traffic-classes to all remote address prefixes) to the alternate reliable ISPs. (An alternative threshold may be configured as a difference from a first-hop domain having a greatest responsiveness, e.g., if the greatest responsiveness were 80%, then a configurable amount of 20% less than that (60%) would be a cut-off for a first-hop domain to be deemed responsive enough to be included in load balancing.) FIG. 3B illustrates the computer network showing traffic being forwarded (e.g., load balanced) over reliable first-hop domains ISP1 and ISP2 to reach any general destination address prefix beyond the corresponding first-hop domains (e.g., within the WAN/Internet), regardless of prefix or traffic-class.

Thus, the reliability through the first-hop domains (e.g., ISPs) is determined by a few probe targets from effectively anywhere in the network beyond the first-hop domains, as opposed to probing each and every destination address prefix, and for each and every traffic-class. The traffic may then be load-balanced across reliable first-hop domains (e.g., sent only over reliable first-hop domains) without determining the individual reachablility of the traffic-class (i.e., load balancing is not traffic-class specific). Notably, the actual load-balancing may be performed in any desirable manner, such as various hashing algorithms to send certain flows over certain paths/exits (e.g., based on prefixes), to send a proportion of the traffic equal to a ratio of reliability (e.g., 99/90 for ISP1/ISP2), etc. Moreover, those skilled in the art may appreciate that the techniques described herein are not specifically optimizing routing based on performance measurements, but rather are merely load balancing traffic across reliable first-hop domains (and thus not sending traffic over unreliable first-hop domains). In other words, the measurements obtained from the probe messages 310 are not applied to the prefixes or traffic-classes specifically, but to the paths/exits generally for all traffic.

Figure 4:
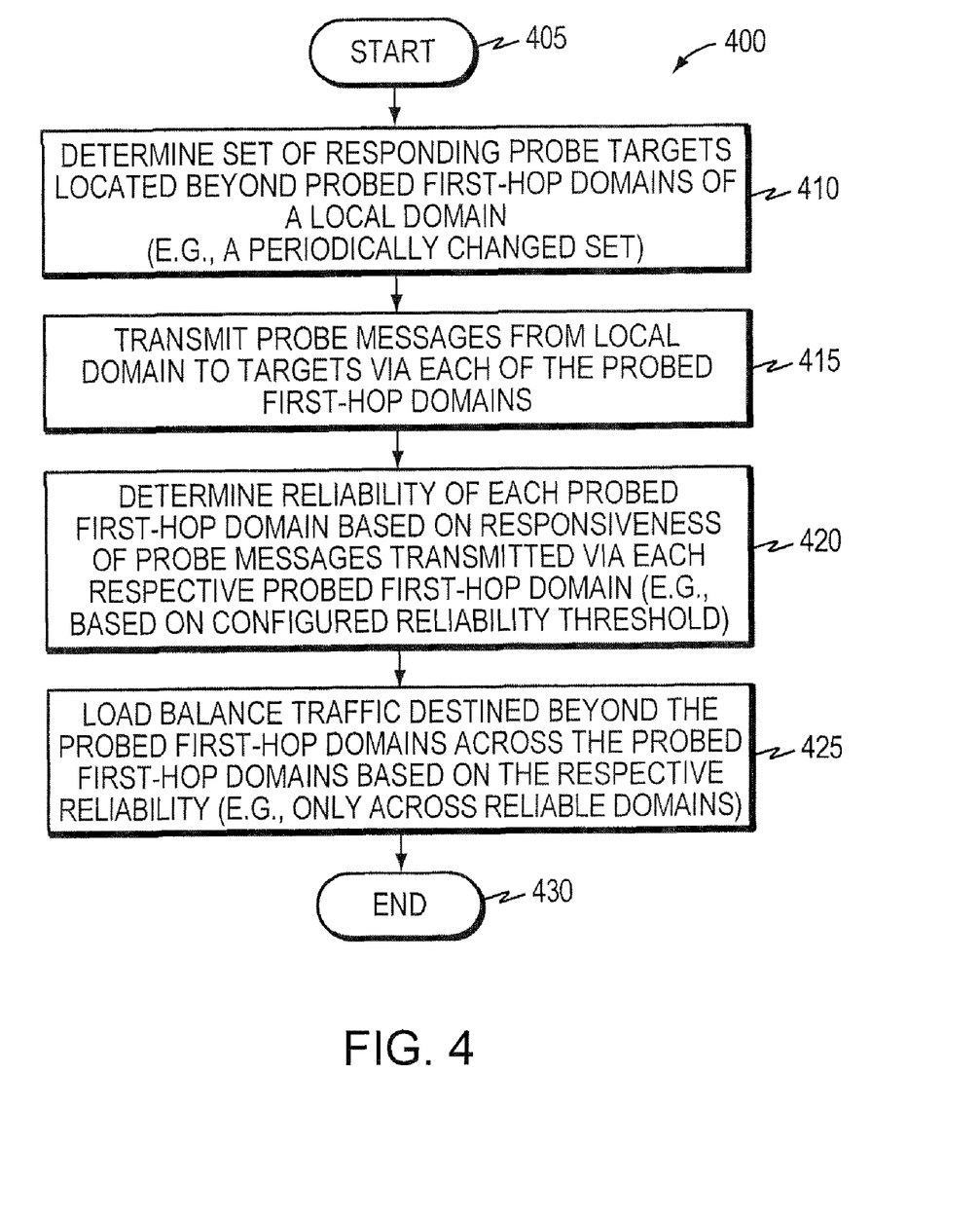
FIG. 4 illustrates an example procedure for measuring reliability of first-hop do-mains for exit path load balancing.

FIG. 4 illustrates an example procedure for measuring reliability of first-hop domains for exit path load balancing in accordance with one or more embodiments described herein. The procedure 400 starts at step 405, and continues to step 410, where a set of responding probe targets (e.g., T1, T2, etc., of set 246) located beyond probed first-hop domains of a local domain is determined as described above (e.g., a periodically changed set). Probe messages 310 may then be transmitted in step 415 from the local domain to the targets via each of the probed first-hop domains (e.g., from edge routers ER1, ER2, and ER3 through ISP1, ISP2, and ISP3, respectively). Upon receiving the returned probe messages (e.g., at the RMC 201), in step 420 a reliability of each probed first-hop domain may be determined based on responsiveness of the probe messages transmitted via each respective probed first-hop domain. For instance, as mentioned above, the reliability may be based on a configured reliability threshold, such as a percentage of returned probe messages, etc.

In step 425, the RMC may configure the network to load balance any traffic destined beyond the probed first-hop domains (e.g., beyond ISP1, ISP2, and ISP3) across the probed first-hop domains based on the respective reliability, regardless of a traffic-class and a destination of the traffic. For example, if ISP1 is 99% reliable, ISP2 is 90% reliable, and ISP3 is only 70% reliable (e.g., unreliable based on a threshold of greater than 75%), then traffic may all be forwarded on (load balanced across) ISP1 and ISP2, accordingly. The procedure 400 ends in step 430, notably with the inherent option to return to step 410 to update probed targets, or 415 to reuse the same set of targets, etc. for further reliability calculations.

Advantageously, the novel techniques described herein measure reliability of first-hop domains for exit path load balancing in a computer network. By measuring reliability of a particular first-hop domain (e.g., ISP) to a select set of targets, the novel techniques provides for an efficient manner to load balance exit (e.g., WAN) links with minimal probing and without requiring per-prefix reliability. In particular, the techniques described above (active probing rather than passive probing) also decrease the reaction time to congestion and blackout detection of the first-hop domains. Also, the dynamic aspects of one or more embodiments described herein alleviate the need for cumbersome and inefficient manual configuration.

While there have been shown and described illustrative embodiments that measure reliability of first-hop domains for exit path load balancing in a computer network, it is to be understood that various other adaptations and modifications may be made within the spirit and scope of the present invention. For example, the embodiments have been shown and described herein for use with first-hop domain reliability. However, the embodiments of the invention in their broader sense are not so limited, and may, in fact, be used with any first number of hops (e.g., first-and-second-hop reliability) depending upon network configuration, prefix location, etc. Also, while various protocols are mentioned herein, such protocols are meant to be illustrative, and not limiting to the scope of the embodiments herein.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   determining a set of one or more responding probe targets located beyond a plurality of first-hop domains of a local domain in a computer network;
   transmitting a plurality of probe messages from the local domain to the set of targets via each of the first-hop domains;
   determining a reliability of each first-hop domain based on a comparison of an amount of probe messages transmitted via that first-hop domain that receive a probe response to a reliability threshold, wherein more than one but less than all probe messages transmitted from the local domain via at least one first-hop domain receives a probe response; and
   load balancing traffic destined beyond the first-hop domains across the first-hop domains based on the respective reliability, regardless of a traffic-class and a destination of the traffic.

2. The method as in claim 1, wherein load balancing comprises:
   transmitting traffic through only reliable first-hop domains.
3. The method as in claim 2, wherein determining the reliability comprises:
   determining that a first-hop domain is reliable in the event the amount of probe messages transmitted via that first-hop domain that receive a probe response is above the reliability threshold.
4. The method as in claim 3, wherein configuring comprises:
   configuring the reliability threshold to be a threshold that is a configurable difference from an amount associated with a first-hop domain having a greatest responsiveness.
5. The method as in claim 1, wherein the probe messages are not class-specific messages.
6. The method as in claim 5, wherein the load balancing is not class-specific.
7. The method as in claim 1, wherein transmitting comprises:
   transmitting the probe messages as echo messages.
8. The method as in claim 1, wherein determining the set of responding probe targets comprises:
   determining the set of responding probe targets as a subset of a plurality of responding probe targets.
9. The method as in claim 1, further comprising:
   selecting targets that are already known to respond for the set of responding probe targets.
10. The method as in claim 1, further comprising:
    periodically changing the set of responding probe targets.
11. The method as in claim 1, wherein determining the set of responding probe targets comprises:
    determining the set of responding probe targets based on path diversity of paths to reach the targets with the probe messages.
12. The method as in claim 1, further comprising:
    determining that a target is non-responsive via any of the first-hop domains; and
    in response, removing the target from the set of responding probe targets.
13. The method as in claim 1, further comprising:
    configuring the probe messages to have a destination of a particular server port.
14. The method as in claim 13, wherein the known server port is selected from a group consisting of: port 80, a transmission control protocol (TCP) port, and a hypertext transfer protocol (http) port.
15. An apparatus, comprising:
    one or more network interfaces configured to transmit traffic to and receive traffic from a plurality of first-hop domains of a local domain of a computer network;
    a processor coupled to the network interfaces and adapted to execute one or more processes; and
    a memory configured to store a performance routing process executable by the processor, the performance routing process when executed operable to:
      determine a set of one or more responding probe targets located beyond the plurality of first-hop domains of the local domain;
      transmit a plurality of messages to the set of targets via each of the first-hop domains;
      determine a reliability of each first-hop domain based on a comparison of an amount of probe messages transmitted via that first-hop domain that receive a probe response to a reliability threshold, wherein more than one but less than all probe messages transmitted via at least one first-hop domain receives a probe response; and
      load balance traffic destined beyond the first-hop domains across the first-hop domains based on the respective reliability, regardless of a traffic-class and a destination of the traffic.
16. The apparatus as in claim 15, wherein the performance routing process when executed is further operable to:
    load balance through transmission of traffic through only reliable first-hop domains.
17. The apparatus as in claim 15, wherein the probe messages are not class-specific messages.
18. The apparatus as in claim 15, wherein the performance routing process when executed is further operable to:
    determine that a first-hop domain is reliable in the event the amount of probe messages transmitted via that first-hop domain that receive a probe response is above the reliability threshold.
19. The apparatus as in claim 18, wherein the performance routing process when executed is further operable to:
    periodically change the set of the responding probe targets.
20. A non-transitory computer-readable media having software encoded thereon, the software when executed operable to:
    determine a set of one or more responding probe targets located beyond a plurality of first-hop domains of a local domain in a computer network;
    transmit a plurality of probe messages from the local domain to the set of targets via each of the first-hop domains;
    determine a reliability of each first-hop domain based on a comparison of an amount of probe messages transmitted via that first-hop domain that receive a probe response to a reliability threshold, wherein more than one but less than all probe messages transmitted from the local domain via at least one first-hop domain receives a probe response; and
    load balance traffic destined beyond the first-hop domains across the first-hop domains based on the respective reliability, regardless of a traffic-class and a destination of the traffic.
21. A method, comprising:
    determining a plurality of probe targets located beyond a plurality of first-hop domains of a local domain in a computer network;
    transmitting one or more probe messages from the local domain to each of the plurality of probe targets via each of the first-hop domains;
    determining a reliability of each first-hop domain of the plurality of first-hop domains by ascertaining a percentage of probe messages transmitted from the local domain via that first-hop domain that receive a probe response, and comparing the percentage to a reliability threshold, wherein at least one probe message transmitted from the local domain via each first-hop domain receives a probe response; and
    load balancing traffic destined for destinations located beyond the first-hop domains across the first-hop domains based on the respective reliability of each first-hop domain of the plurality of first-hop domains, regardless of a traffic-class and a destination of the traffic.
22. The method as in claim 21, wherein the reliability threshold is a percentage set to be a configurable amount less than a percentage of probe messages that receive a probe response for a first-hop domain having a greatest responsiveness.

23. The method as in claim 21, wherein the probe messages are not class-specific.

24. The method as in claim 21, further comprising:
periodically changing the plurality of probe targets.

25. The method as in claim 21, wherein determining the plurality of probe targets comprises:
determining the plurality of probe targets based on path diversity of paths to reach the probe targets with the probe messages.

26. An apparatus, comprising:
one or more network interfaces configured to transmit traffic to and receive traffic from, a plurality of first-hop domains of a local domain of a computer network;
a processor coupled to the network interfaces and configured to execute one or more processes; and
a memory configured to store a performance routing process executable by the processor, the performance routing process when executed operable to
determine a plurality of probe targets located beyond the plurality of first-hop domains,
transmit, over the one or more network interfaces, one or more probe messages to each of the plurality of probe targets via each of the first-hop domains,
determine a reliability of each first-hop domain of the plurality of first-hop domains by ascertaining a percentage of probe messages transmitted from the local domain via that first-hop domain that receive a probe response, and comparing the percentage to a reliability threshold, wherein at least one probe message transmitted from the local domain via each first-hop domain receives a probe response, and
load balance traffic destined for destinations located beyond the first-hop domains across one or more of the first-hop domains based on the respective reliability of the one or more first-hop domains.

27. The apparatus as in claim 26, wherein the reliability threshold is a percentage set to be a configurable amount less than a percentage of probe messages that receive a probe response for a first-hop domain having a greatest responsiveness.

28. The apparatus as in claim 26, wherein the probe messages are not class-specific.

29. The apparatus as in claim 26, wherein the performance routing process when executed is further operable to:
periodically change the plurality of probe targets.

30. The apparatus as in claim 26, wherein the performance routing process when executed is further operable to:
determine the plurality of probe targets based on path diversity of paths to reach the probe targets.

* * * * *